United States Patent
Lott et al.

(10) Patent No.: US 8,750,114 B2
(45) Date of Patent: Jun. 10, 2014

(54) ENHANCED FLOW CONTROL

(75) Inventors: Christopher Gerard Lott, San Diego, CA (US); Donna Ghosh, San Diego, CA (US); Radhika Gowaikar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 13/343,220

(22) Filed: Jan. 4, 2012

(65) Prior Publication Data
US 2013/0003552 A1    Jan. 3, 2013

Related U.S. Application Data

(60) Provisional application No. 61/484,598, filed on May 10, 2011.

(51) Int. Cl.
*H04L 1/00* (2006.01)
*H04L 12/26* (2006.01)

(52) U.S. Cl.
USPC ............ 370/232; 370/229; 370/235; 370/236

(58) Field of Classification Search
USPC ................. 370/229, 230, 235, 238, 254, 310, 370/310.2, 312, 315, 328, 329, 331, 332, 370/337, 338, 412, 413, 465; 455/7, 13.1, 455/69, 423, 435.1, 450, 453, 455, 456.2
See application file for complete search history.

(56) References Cited

U.S. PATENT DOCUMENTS

| | | | |
|---|---|---|---|
| 6,442,139 | B1 | 8/2002 | Hosein |
| 7,079,856 | B2 | 7/2006 | Khan |
| 7,706,403 | B2 | 4/2010 | Hosein |
| 2007/0264932 | A1 | 11/2007 | Suh et al. |
| 2009/0279482 | A1 | 11/2009 | Tinnakornsrisuphap et al. |
| 2010/0098047 | A1 | 4/2010 | Zhou et al. |

FOREIGN PATENT DOCUMENTS

WO    0126305    4/2001

OTHER PUBLICATIONS

Qualcomm1, "DL SCheduling, RLC and Flow Control assumption for Inter-NodeB Multi-Point Transmissions", Jan. 11, 2011, 3GPP, all pages.*
International Search Report and Written Opinion—PCT/US2012/037393—ISA/EPO—Jul. 27, 2012.

* cited by examiner

*Primary Examiner* — Kwang B Yao
*Assistant Examiner* — Adam Duda
(74) *Attorney, Agent, or Firm* — Jeffrey D. Jacobs (57) ABSTRACT

A method of wireless communication includes periodically adjusting a target queue length based on an estimated throughput of a network link and based on a measured underflow on the network link. The target queue length represents an amount of data being buffered at a network element. The method also includes controlling a link throughput based on the target queue length.

20 Claims, 7 Drawing Sheets

ENHANCED FLOW CONTROL

CROSS-REFERENCE TO RELATED APPLICATION

This application claims the benefit under 35 U.S.C. §119(e) to U.S. Provisional Patent Application No. 61/484,598, entitled, ENHANCED FLOW CONTROL, filed on May 10, 2011, in the names of LOTT, et al., the disclosure of which is expressly incorporated by reference herein in its entirety.

BACKGROUND

1. Field

Aspects of the present disclosure relate generally to wireless communication systems, and more particularly to enhanced flow control in wireless networks, such as EV-DO, HSPA and LTE networks.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

According to some aspects of the disclosure, a method of communicating in a wireless network includes periodically adjusting a target queue length based on an estimated throughput of a network link and based on a measured underflow on the network link. The target queue length represents an amount of data being buffered at a network element. The method may also include controlling a link throughput based on the target queue length.

According to some aspects of the disclosure, an apparatus for communicating in a wireless network includes means for periodically adjusting a target queue length based on an estimated throughput of a network link and based on a measured underflow on the network link. The target queue length represents an amount of data being buffered at a network element. The apparatus may also include means for controlling a link throughput based on the target queue length.

According to some aspects of the disclosure, an apparatus for communicating in a wireless network includes a memory and at least one processor coupled to the memory. The processor(s) is configured to periodically adjust a target queue length based on an estimated throughput of a network link and based on a measured underflow on the network link. The target queue length represents an amount of data being buffered at a network element. The processor(s) is further configured to control a link throughput based on the target queue length.

According to some aspects of the disclosure, a computer program product for wireless communications in a wireless network includes a computer-readable medium having non-transitory program code recorded thereon. The program code includes program code to periodically adjust a target queue length based on an estimated throughput of a network link and based on a measured underflow on the network link. The target queue length represents an amount of data being buffered at a network element. The program code also includes program code to control a link throughput based on the target queue length.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
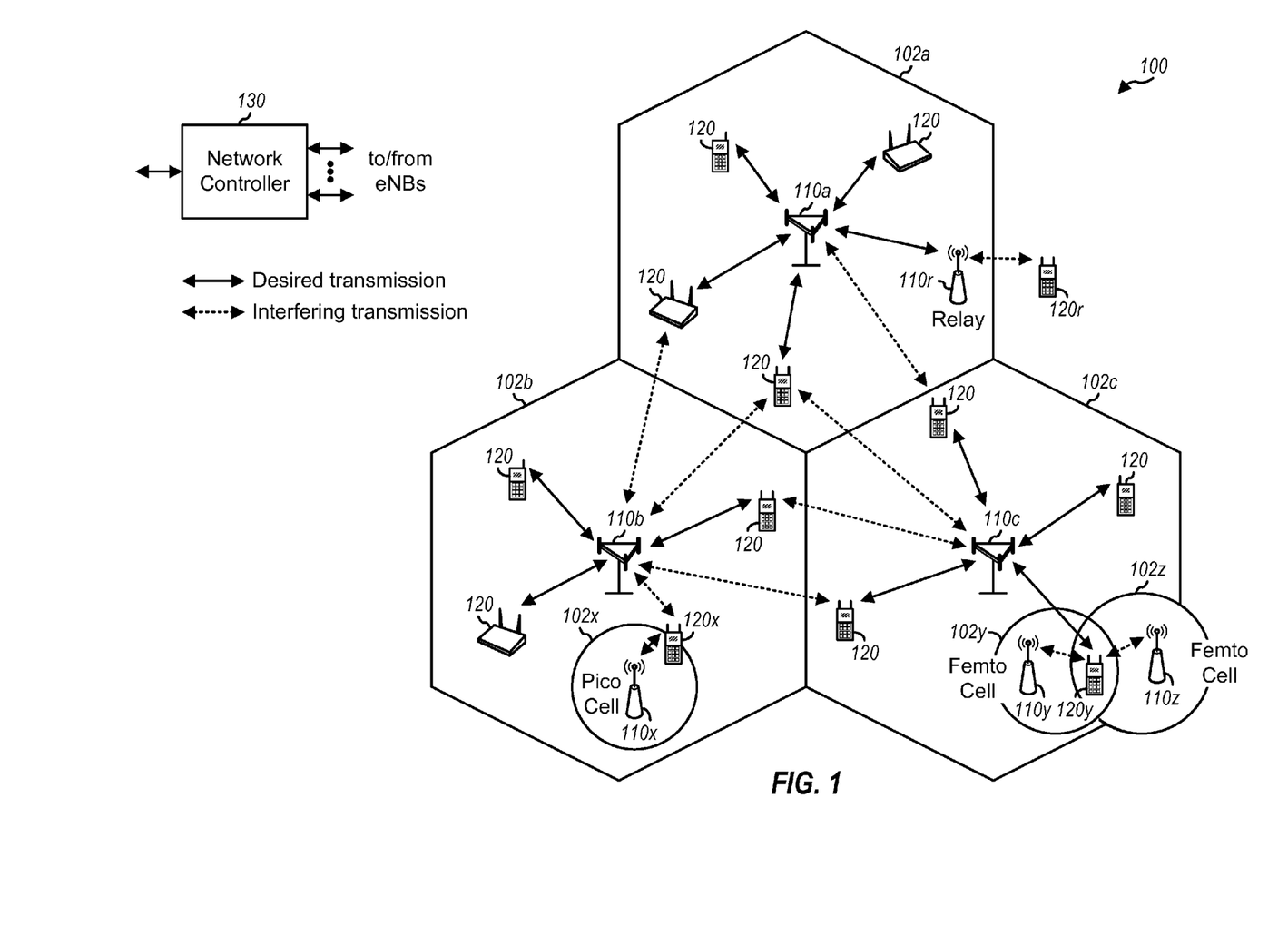
FIG. 1 is a block diagram conceptually illustrating an example of a telecommunications system in which the present disclosure can operate.

FIG. 1 shows a wireless communication network 100, which may be an LTE-A network, in which enhanced flow control may be implemented. The wireless network 100 includes a number of evolved node Bs (eNodeBs) 110 and other network entities. An eNodeB may be a station that communicates with the UEs and may also be referred to as a base station controller (BSC)/base transceiver station (BTS), a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. In addition, an eNodeB for a femto cell may be referred to as a femto eNodeB or a home eNodeB. In the example shown in FIG. 1, the eNodeBs 110*a*, 110*b* and 110*c* are macro eNodeBs for the macro cells 102*a*, 102*b* and 102*c*, respectively. The eNodeB 110*x* is a pico eNodeB for a pico cell 102*x*. In addition, the eNodeBs 110*y* and 110*z* are femto eNodeBs for the femto cells 102*y* and 102*z*, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110*r* may communicate with the eNodeB 110*a* and a UE 120*r* in order to facilitate communication between the eNodeB 110*a* and the UE 120*r*. A relay station may also be referred to as a relay eNodeB, a relay, etc.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
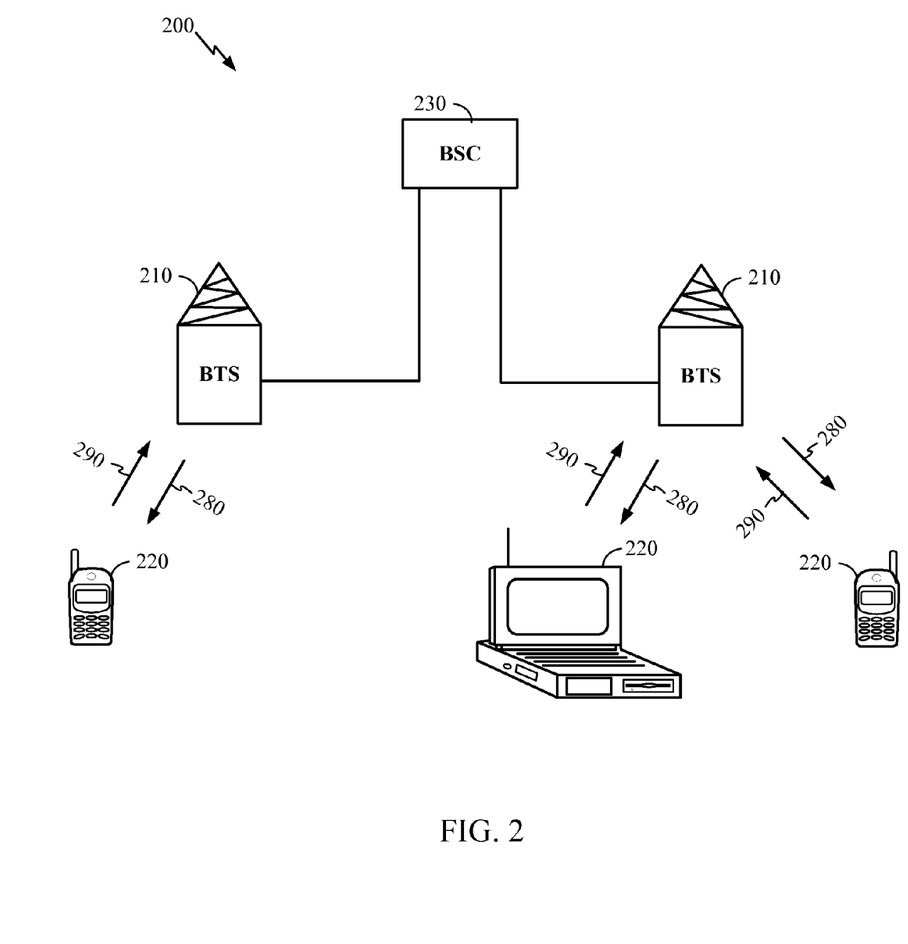
FIG. 2 is a block diagram of an alternative wireless communication system in which the present disclosure can operate.

FIG. 2 shows an alternate wireless communication system 200 in which aspect of the present disclosure may operate. For purposes of illustration, FIG. 2 shows remote units (ATs) 220, base transceiver stations (BTSs)/base stations 210, and a base station controller (BSC) 230. It will be recognized that wireless communication systems may have many more remote units (ATs) 220, or BTSs 210, and base station controllers 230. Similar to the UEs described above, the remote units (ATs) 220 may be, for example, personal digital assistants (PDAs), smartphones, cellular phones, laptop computers, netbook computers, desktop computers, media extender devices, tablets, and media set top boxes.

FIG. 2 shows the forward link signals 280 from the BTSs 210 and the remote units (ATs) 220. FIG. 2 also illustrates the reverse link signals 290 from the remote units (ATs) 220 to the BTSs 210.

The base station controller 230 and/or other processors and modules at the network controller or base station controller 230 may perform or direct the execution of various processes for the techniques described herein. The AT 220, BTS 210, BSC 230 and included processors and modules may also perform or direct the execution of the functional blocks illustrated in the method flow chart of FIG. 3, and/or other processes for the techniques described herein.

Figure 3:
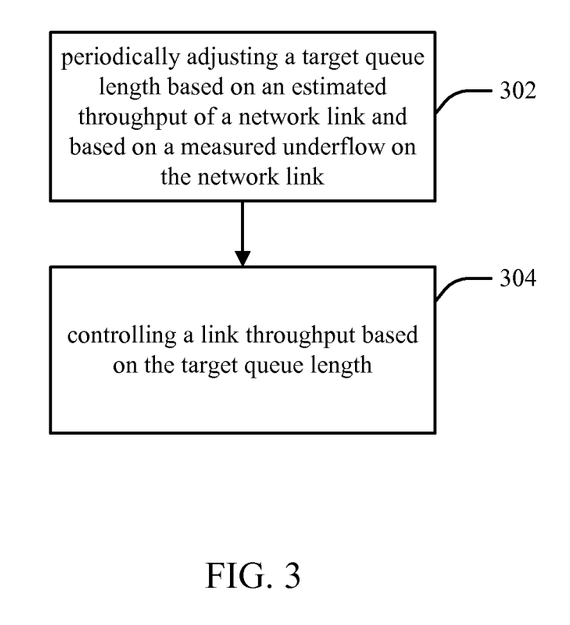
FIG. 3 shows a wireless communication method according to some aspects of the disclosure.

FIG. 3 shows a wireless communication method or process according to some aspects of the disclosure. The process begins at block 302 where a target queue length is periodically adjusted based on an estimated throughput of a network link and based on a measured underflow on the network link. The target queue length represents an amount of data being buffered at a network element. At block 304, a link throughput is controlled based on the target queue length.

Figure 4:
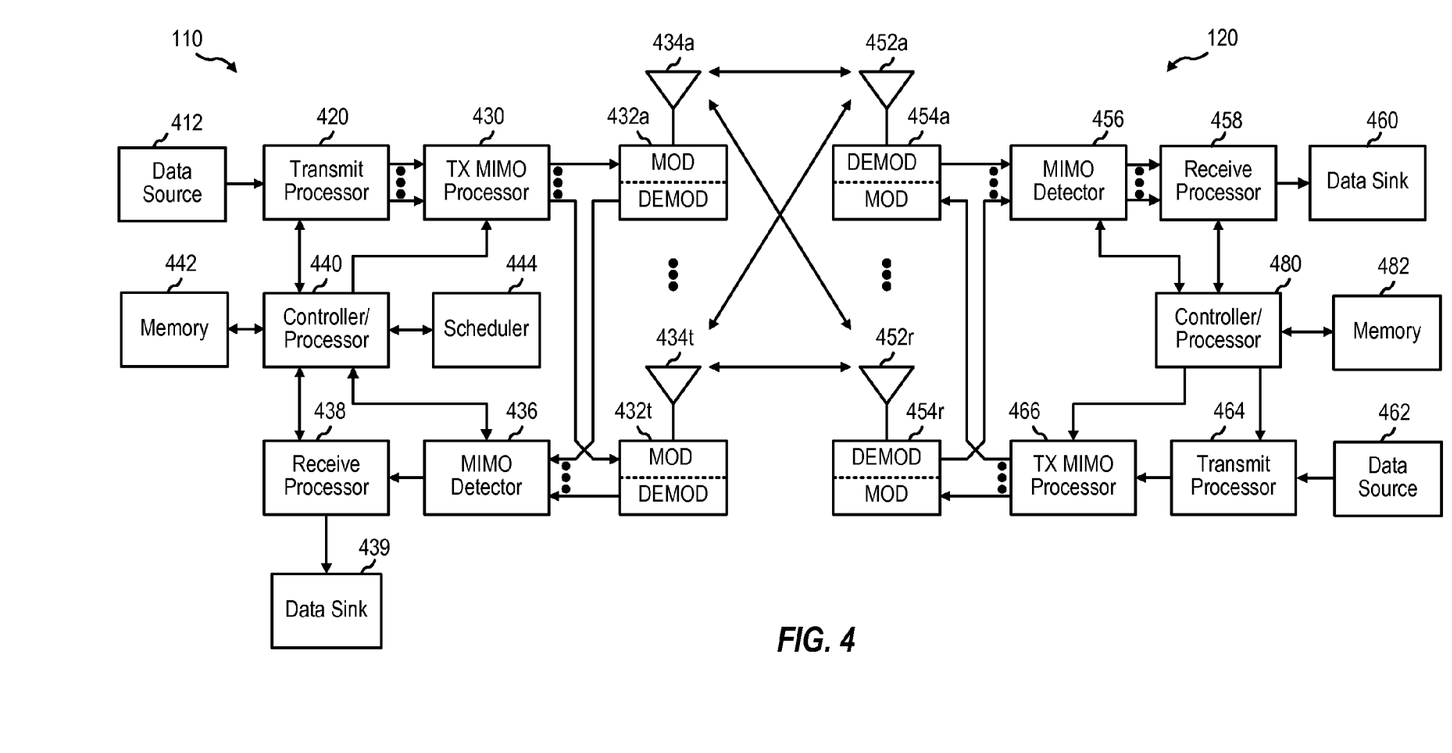
FIG. 4 is a block diagram conceptually illustrating a design of a base station controller (BSC)/base transceiver station (BTS)/eNodeB and an access terminal/user equipment configured according to one aspect of the present disclosure.

FIG. 4 shows a block diagram of a design of a base transceiver station 210/eNodeB 110 (generally referred to as base station 110) and a UE 120/AT 220 (generally referred to as a UE 120) in which the enhanced flow control process may be implemented. The base station may be equipped with antennas 434a through 434t, and the UE 120 may be equipped with antennas 452a through 452r.

At the base station 110, a transmit processor 420 may receive data from a data source 412 and control information from a controller/processor 440. The processor 420 may process (e.g., encode and symbol map) the data and control information to obtain data symbols and control symbols, respectively. The processor 420 may also generate reference symbols. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data from a data source 462 and control information from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the execution of various processes for the techniques described herein. The memories 442 and 482 may store data and program codes for the base station 110 and the UE 120, respectively. A scheduler 444 may schedule UEs for data transmission on the downlink and/or uplink.

LTE-Advanced UEs use spectrum in up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

Figure 5A:
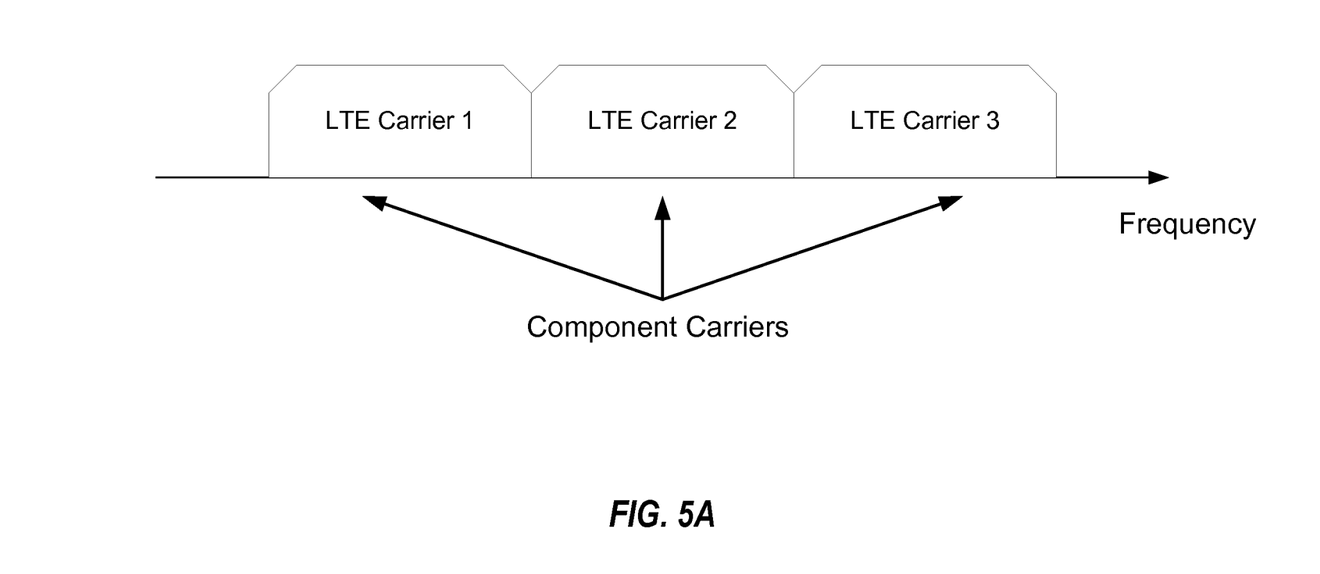
FIG. 5A discloses a continuous carrier aggregation type.
Figure 5B:
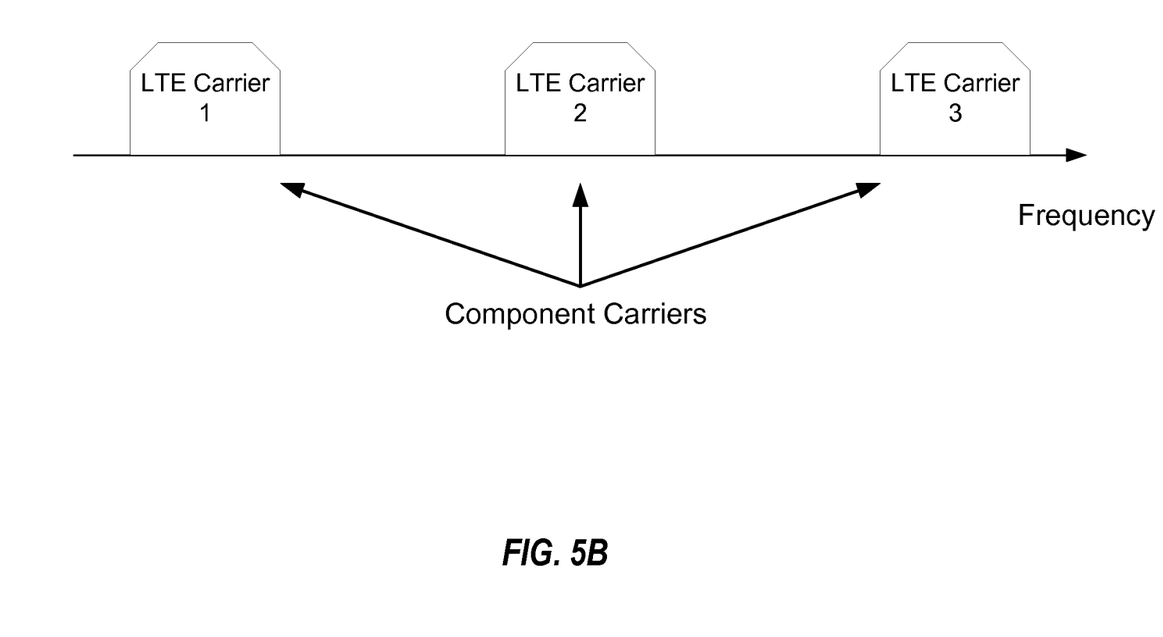
FIG. 5B discloses a non-continuous carrier aggregation type.

For the LTE-Advanced mobile systems, two types of carrier aggregation (CA) methods have been proposed, continuous CA and non-continuous CA. They are illustrated in FIGS. 5A and 5B. Non-continuous CA occurs when multiple available component carriers are separated along the frequency band (FIG. 5B). On the other hand, continuous CA occurs when multiple available component carriers are adjacent to each other (FIG. 5A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE because the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Enhanced Flow Control

The enhanced flow control method may apply to any network where there is cooperative scheduling across the different links. Running scheduling processes on the network can lead to different flow routing on each of the links. In some aspects, sending data down the different links focuses on using the available resources (i.e., fully utilizing the available queue length) and on the efficiency of each link relative to the other links for improving the network. Many of the features described below are adaptable for use in systems such as EV-DO, Universal Mobile Telecommunications System (UMTS), Global System for Mobile Communications/Enhanced Data Rates for GSM Evolution (GSM/EDGE), High Speed packet Access (HSPA), Long Term Evolution (LTE), LTE-Advanced and the like. The following description is primarily with respect to EV-DO, in particular links between the BTS and the BSC for the sake of illustration. The concepts apply to other systems, such as HSPA and LTE-A. In this case, the links would refer to different component carriers in a carrier aggregation/multi carrier configuration. Alternatively, the links could be with respect to multipoint communications.

Some aspects of the disclosure implement a wireless network flow control based on a link rate estimation, queue underflow statistics and link scheduler interaction. The link rate estimation sets an upper bound for a link queue length by setting a static upper bound on a link queue delay. Queue underflow statistics are implemented to drive down the queue length to reduce or minimize delay while maintaining data available for link scheduling. Some aspects of the disclosure are implemented such that underflow utilization is avoided. The link rate estimation is determined over a time period that is adequate to maintain a desired delay bound. One aspect of the disclosure modifies a link scheduler to ensure delays are met under unfavorable conditions. When an estimated delay is beyond a target estimation, for example, a scheduler priority boost may be implemented to improve the delay conditions. Scheduler priority bounds are implemented to provide a lower bound on an estimated link rate and an upper bound on a scheduling interval to improve the delay conditions. One aspect of the present disclosure implements delayed flow splitting based on large expected scheduling intervals. This implementation reduces the time spent in a link scheduler queue. Each link maintains its own flow control to accommodate a distributed implementation with limited or no coordination across link scheduler or flows.

One aspect of the present disclosure describes an enhanced flow control process for wireless networks such as EV-DO, HSPA, LTE and the like. As noted above, the system may support distributed network scheduling (DNS), where a flow priority at a given sector-carrier may be substantially reduced due to improved opportunities elsewhere in the network. In some aspects of the disclosure, the enhanced flow control process includes periodically adjusting a target queue length based on an estimated delay of a link and based on a measured underflow on the link. The target queue length may represent an amount of data being buffered at a base station.

Aspects of the disclosure apply to communications systems with multiple links. A link can be defined as a connection between a base transceiver station and a base station controller (BSC). Each link may be shared with other users by dividing the link in time and/or frequency. Moreover, channel quality can be variable in time. Therefore, there is an uncertainty about the resources afforded to each link. Transmitting data to a link that is operating below the resources afforded to the link results in underflow and a wasted service opportunity. The uncertainty is compounded by splitting a data flow among multiple links. Splitting the flow may result in uncertain delays on the link that may be related to queuing delay, transmission time delay and delivery service time, for example. Moreover, a high delay differential (or delay skew) across multiple links may lead to excessive retransmissions or even delivery service failure. Accordingly, there is a desire to resolve uncertainty about resources afforded to each link and the uncertainties due to a delay on each link.

In some aspects of the present disclosure, the uncertainty is addressed by estimating the rate of usage on the link and determining a target queue length based on the rate of throughput at the link, in addition to the queue underflow. The target queue length may be the amount of data to be buffered at the BTS, for example, prior to transmission to an AT.

In a multi-carrier wireless packet data system, where there are multiple BTS queues, RLP (radio link protocol) packets may arrive out-of-order at the AT 220 because different carriers transmit at different rates. The different rates across the carriers may be due to different loading across the carriers. The loading across the carriers can be based on the number of ATs served by the carrier, the traffic demand, and quality of service associated with the ATs. The different rates across the carriers may also be due to different digital rate controls (DRCs) across the carriers due to asymmetric geometry (e.g., hotspot) and slow fading. These different rates often result in a network delay and a surge in Negative-Acknowledgement (NAK) and unnecessary retransmission or even a data delivery failure associated with an abort timer. Other potential causes for delay across carriers in multi-carrier wireless packet data systems include a fixed round trip delay (RTD) difference across backhauls, backhaul round trip delay variations (e.g., when a backhaul is limited during moments of peak load), and scheduling time variation due to a forward link scheduler time constant.

To avoid spurious NAKs and unnecessary retransmissions, Multi-Link Multi-Flow RLP in the AT 220 waits for a certain time, T, ms after detecting a gap before starting an abort timer and sending a NAK to the BSC 230. The optimal value of T depends on the time specified to transmit data that can get out-of-order between carriers (i.e., "skew"). The value T can be small so that applications (e.g., TCP) would not be affected; however, it should be large enough to cover most of the possible skews. Otherwise, a large number of packets are retransmitted unnecessarily. Furthermore, many packets may not arrive at the AT 220 when the abort timer expires. Therefore, one aspect of the disclosure reduces or minimizes skew in a multi-carrier wireless packet data system.

For the multi-carrier system, a flow control mechanism can be implemented for reducing skew while preserving over-the-air efficiency. In one configuration, the flow control mechanism specifies that the amount of data buffered at each BTS queue is the smallest without allowing the buffer to run empty. Depending on factors such as sector loading, channel condition, and round-trip delays, the appropriate amount of buffered data is easily determined through a formula. For example, an AT 220 in a good condition in a loaded sector may have low throughput although operating at a very high peak rate. The proposed process has very few parameters and can dynamically adjust to the appropriate flow control window and headroom.

Let a target queue length (i.e., Target_$Q_{BTS}$) be the amount of data being buffered at the BTS 210. The BTS 210 may increase the target queue length by a small multiplicative factor, e.g., 1.005, every time period (e.g., a slot) the BTS 210 queue is less than or equal to a threshold. Otherwise, the BTS 210 may decrease the target queue length by a small constant value every time period (e.g., 1 byte/slot) that the BTS queue is above the threshold. The changes in the target queue length occur when the BSC 230 queue is not empty. In this configuration, when a queue at the base station controller (BSC) 230 is empty, the target queue length is frozen.

Each flow control window at the BTS 210 receives data (e.g., Target_$Q_{BTS}$/k bytes of data, where k is an integer, e.g., 3) requested from the BSC 230. The flow control window specifies the number of bytes of data, for example, that a receiver can receive. The size of the flow control window is set proportional to the size of the target queue length. This process reacts quickly (e.g., through multiplicative increase) against buffer under run. The buffer or queue under runs because there is not enough data to fill the queue due to a limited delivery rate. The longer the queue stays under run, the larger the target queue length increase. Nevertheless, once the queue is large enough that buffer under run does not occur, then the targeted queue size gradually declines to keep the buffer size small. As a result, the buffer under run probability is well regulated while the amount of buffered data at the BTS 210 is small.

One aspect of the present disclosure dynamically adjusts the upper bound of the target queue length, referred to herein as "Current_Qmax". In this configuration, the upper bound is set proportional to the filtered throughput for the flow. The filtered throughput is an estimate of the throughput of a single link. The filtered throughput is measured when the flow has a non-empty queue and the target queue length is greater than or equal to the current queue length. Measuring the filtered throughput under these conditions provides a closer estimate of the throughput seen by bytes waiting in the queue. When the queue is empty or when the target queue length is less than the current queue length, the filter for the flow throughput is frozen. A data request to fill in a flow control window may be transmitted to a BSC 230. A target queue length at a receiver associated with the request may be bounded by a maximum target queue length and a minimum target queue length. In some aspects of the disclosure, the minimum target queue length ($Q_{min}$) may be based on the following:

$$Q_{min} = Q_{BTS\_Thresh}/(1-1/k)$$

where $Q_{BTS\_Thresh}$ is a threshold queue length
where k is an integer

In some aspects of the disclosure, underflow can be controlled by an underflow process that measures an underflow ratio and adjusts a target queue length based on the underflow. In some aspects of the disclosure, the target queue length is increased by a multiplicative factor every time period (e.g., a slot) when a base station has a queue length less than or equal to a threshold queue length. In this aspect of the disclosure, the target queue length is decreased by a constant value every time period (e.g., a slot) when a base station queue is greater than a threshold queue length.

According to an aspect of the disclosure, to address both underflow and delay, an underflow analysis and a delay analysis are combined to yield a single target queue length that is at most proportional to an expected throughput. That is, the target queue length is upper bounded by a value that is proportional to the expected throughput to bound the delay. The target queue length, however, can be smaller in the absence of under run conditions, resulting in a smaller delay. The resulting target queue length is bounded by a maximum queue length and a minimum queue length. The maximum queue length can be proportional to a filtered throughput, which bounds the delay. The filtered throughput may be measured when an access terminal has a non-empty queue at a BTS scheduler. The minimum queue length may be based on the underflow description above.

The enhanced flow control method may apply to any network where there is cooperative scheduling across the different links. Running scheduling processes on the network can lead to different flow routing on each of the links. In some aspects, sending data down the different links focuses on using the available resources (i.e., fully utilizing the available queue length) and on the efficiency of each link relative to the other links for improving the network. Cooperative scheduling implementations allow for extremely fast changes in the link throughputs because the implementation can funnel data through different routes based on distributed network scheduling (DNS), for example. The implementation allows for an interaction with priorities of scheduling to maintain delay bounds that the enhanced flow control implementation determines. As a result, the resource allocation of the network is improved through distributed network scheduling (DNS) and enhanced flow control, without explicit coordination. In other words, neither the DNS nor enhanced flow control implementation explicitly controls one another. The DNS process makes network scheduling decisions, and the enhanced flow control implementation funnels/routes data based on the target queue lengths. The combination provides an improved overall allocation.

The DNS and enhanced flow control implementation operate together without explicit interaction because the throughput filter time for enhanced flow control is comparable to but somewhat slower than the throughput filter time for distributed network scheduling. The difference in time allows the DNS to efficiently react to network changes. The difference in time also allows the enhanced flow control implementation to correctly allocate flows and to quickly react to DNS changes in order to update the allocated flows accordingly. In addition, a time constant for a filter of an effective load of a overall network load balancing solution is longer than the throughput filter times for the enhanced flow control and the distributed network scheduling processes. This means the effective load value changes more slowly than the throughputs the scheduling and enhanced flow control processes use. Thus, the processes are able to converge with the overall effective load changing by only a small amount, helping guarantee convergence. That is, the effective load time constant being longer ensures the combination of DNS and the flow control implementation converge. The overall network load balancing solution is described in detail in U.S. patent application Ser. No. 13/167,169 to GHOSH et al, filed Jun. 23, 2011, the disclosure of which is expressly incorporated by reference herein in its entirety.]

When the enhanced flow control process is implemented in conjunction with a scheduling implementation, the scheduling can lead to different flow routing on each link between a BTS 210 and an AT 220. In a conventional scheduling implementation, when the target queue length is extremely small, the link between a BTS 210 and an AT 220 can be limited or shut-off to improve network efficiency. When the enhanced flow control process is implemented in conjunction with a scheduling implementation, the delay bounds of the link can be maintained at a very low throughput to avoid shutting off or limiting use of the entire link.

In one configuration when the queue length is greater than the target queue length, the scheduling priority of the AT 220 associated with a corresponding link can be temporarily boosted or enhanced. Temporarily boosting the scheduling priority of the AT 220 can effectively override the network scheduling of the AT 220 to ensure a delay bound is met.

Boosting the scheduling priority of an AT 220 by maintaining the delay bounds during dynamic changes to the system may cause unintended consequences. For example, the throughput of the link used to determine delay is altered during boosting. As a result, the filter for the flow throughput can be frozen during boosting of the scheduling priority. Freezing of the filter avoids incorporating throughput associated with boosting into the delay determination.

Inter-scheduling intervals for transmission over a link to an AT 220 can be subject to large intervals due to an inefficiency of the link between the AT 220 and the BTS 210. The large intervals can be due to the scheduling time or scheduling priority being limited based on a scheduling implementation, such as a DNS. Under such conditions, the scheduling intervals can become larger than the delay bound such that maintaining the delay bound becomes difficult. In some aspects of the disclosure, a lower bound of the scheduling priority is set to keep an inter-scheduling interval within a bound and/or to keep a link flow rate above a minimum value. By setting a lower bound for the scheduling priority, uncontrollable delays due to unpredictable scheduler behavior can be limited or avoided. As a result, a small flow over the link is maintained even though stopping the flow may be the desirable option for a scheduling implementation, such as DNS. Maintaining a small flow can allow for a rapid reaction to loading changes. For example, maintaining a small flow allows for rapid system reaction to dynamic changes associated with loading and user distribution, thereby improving resource usage and trunking gain in the network.

When the BSC 230 does not have enough data to fill the open windows or queue target sizes, a strict priority rule can be implemented. The rule allows for the improved or optimal throughput to be allocated to the corresponding users (i.e., AT) to fill up the window sizes. The rule minimizes or reduces packet fragmentation and achieves improved or optimal network allocation.

When a flow is initialized in the system to support a new AT 220 entering the network, for example, some uncertainties may exist about the state of the system. For example, the size of an initial window may be unknown because the flow throughput is unknown. As a result, it can be difficult to establish or maintain a delay bound.

One aspect of an enhanced flow control process accounts for some of the uncertainties by estimating the window size based on a parameter, Neff, associated with an estimated load of the network. For example, the window is set as a function of the estimated number of ATs with which the new AT 220 shares a link. In some aspects of the disclosure, the initial window size is determined by the following:

Initial window size (in bytes)=$3500/(1+Neff)$ where Neff is the estimated number of users with which the new user shares a link.

According to some aspects of the disclosure, the BTS 210 increases or ramps up the amount of data to be buffered at the BTS 210 (i.e., Target_$Q_{BTS}$) by a small multiplicative factor every time period (e.g., every slot) the BTS queue is less than or equal to a threshold. In some cases, however, ramping up by the current multiplicative factor from a small target queue length to a desired rate of usage of a given link may exhibit a slow recovery. As a result, one aspect of the enhanced flow control process incorporates a multiplicative factor plus an additive term to speed up the ramping process. For example, an up ramping rule may include an additive factor of 1.0 and may be updated according to the following:

$1.0+\text{Target\_}Q_{BTS}*\text{multiplicative factor}$.

Such an up ramping rule helps when the queue target is very small.

In some aspects of the disclosure, the upper bound of the target queue length, which is based on the throughput limit, is adjusted dynamically. The adjusting occurs regardless of whether the target queue length is greater than, equal to, or less than the actual queue length Adjusting the upper bound when the target queue length is less than the actual queue length is desirable for accommodating a low scheduling priority. In some aspects of the disclosure, the low scheduling priority is accommodated by reducing the delay bound and by triggering a scheduler priority boost.

A further aspect of the flow control process analyzes the lower limit of the target queue length. By controlling the lower limit, an amount of CPU processing can be reduced, for example, when a short backhaul delay exists. A short backhaul delay can cause excessive processing to send updated data. The flow control process dynamically adjusts the lower bound of the target queue length based on the upper bound of the queue. In one configuration, the value of the lower bound is the maximum of: the original lower bound and the current upper bound divided by a constant. In one exemplary configuration, the value of the constant is 3. Adjusting the lower bound of the target queue length may introduce a new lower bound on the link delay. As mentioned above, when the delay limit is too short, new data may be requested from the BSC 230 every time data served at the link is completed. Adjusting the lower bound of the target queue length may increase the delay bound and subsequently reduce the CPU processing load at the BSC 230, the BSC-BTS link utilization and also packet fragmentation.

It should be understood that present disclosure operates in EV-DO, EV-DO-Advanced, HSPA, LTE, LTE-A networks. For example, with respect to LTE-A, carrier aggregation environments as well as a Multipoint aspect of CoMP (coordinated multi point) environments are supported. In general, the enhanced flow process is applicable whether or not multiple links are on the same carrier. The enhanced flow process applies to both multicarrier and multipoint (referred to as a single-carrier multi-link in EV-DO). The present disclosure also applies to High Speed Packet Access (HSPA) networks, for example with respect to a Multipoint configuration.

Figure 6:
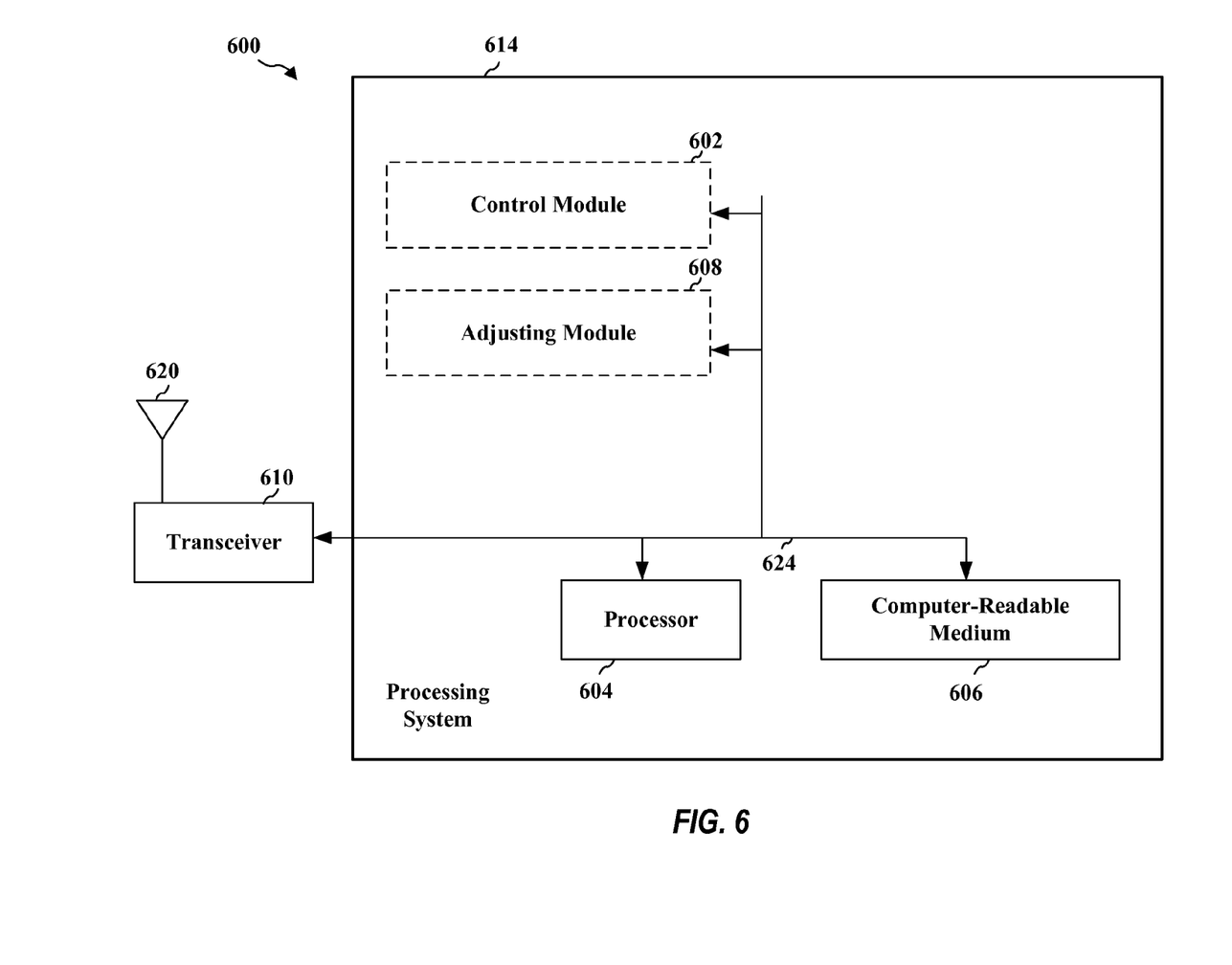
FIG. 6 is a diagram illustrating an example of a hardware implementation for an apparatus employing enhanced flow control.

FIG. 6 is a diagram illustrating an example of a hardware implementation for an apparatus 600 employing an enhanced flow control system 614. The enhanced flow control system 614 may be implemented with a bus architecture, represented generally by a bus 624. The bus 624 may include any number of interconnecting buses and bridges depending on the specific application of the enhanced flow control system 614 and the overall design constraints. The bus 624 links together various circuits including one or more processors and/or hardware modules, represented by a processor 604, an adjusting module 608 and a control module 602, and a computer-readable medium 606. The bus 624 may also link various other circuits such as timing sources, peripherals, voltage regulators, and power management circuits, which are well known in the art, and therefore, will not be described any further.

The apparatus includes the enhanced flow control system 614 coupled to a transceiver 610. The transceiver 610 is coupled to one or more antennas 620. The transceiver 610 provides a means for communicating with various other apparatus over a transmission medium. The enhanced flow control system 614 includes the processor 604 coupled to the computer-readable medium 606. The processor 604 is responsible for general processing, including the execution of software stored on the computer-readable medium 606. The software, when executed by the processor 604, causes the enhanced flow control system 614 to perform the various functions described supra for any particular apparatus. The computer-readable medium 606 may also be used for storing data that is manipulated by the processor 604 when executing software. The enhanced flow control system 614 further includes the adjusting module 608 and the control module 602. The adjusting module 608 and the control module 602 may be software modules running in the processor 604, resident/stored in the computer readable medium 606, one or more hardware modules coupled to the processor 604, or some combination thereof. The enhanced flow control system 614 may be a component of the eNodeB 110 and may include the memory 442 and/or at least one of the TX MIMO processor 430, the transmit processor 420, the receive processor 438, and the controller/processor 440.

In one configuration, the apparatus 600 for wireless communication includes means for periodically adjusting a target queue length based on an estimated throughput of a network link and based on a measured underflow on the network link. The periodically adjusting means may be the adjusting module 608 and/or the enhanced flow control system 614 of the apparatus 600 configured to perform the functions recited by the periodically adjusting means. As described above, the enhanced flow control system 614 may include the memory 442, and/or the controller/processor 440. In another aspect, the aforementioned means may be any module or any apparatus configured to perform the functions recited by the aforementioned means.

The apparatus 600 for wireless communication may also include means for controlling a link throughput based on the target queue length. The controlling means may be the control module 602 and/or the enhanced flow control system 614 of the apparatus 600 configured to perform the functions recited by the controlling means. As described above, the enhanced flow control system 614 may include the memory 442, and the controller/processor 440. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   periodically adjusting a target queue length, by a controller, based on an estimated throughput of a network link and based on a measured underflow on the network link, the target queue length representing an amount of data being buffered at a network element; and
   controlling a link throughput, by the controller, based on the target queue length.

2. A method of claim 1, further comprising bounding the target queue length with a dynamically updated maximum target queue length and a dynamically updated minimum target queue length.

3. The method of claim 2, in which the minimum target queue length is based on a current maximum target queue length.

4. The method of claim 1, in which the periodically adjusting occurs at every time period the target queue length is above a threshold value.

5. The method of claim 1, in which the target queue length is proportional to the estimated throughput.

6. The method of claim 1, in which the periodically adjusting occurs independently on each of a plurality of network links.

7. The method of claim 1, further comprising temporarily boosting a priority of a network link when a current queue length is greater than the target queue length.

8. The method of claim 1, in which the estimated throughput is based on a filtered value when a queue is non-empty.

9. The method of claim 8, in which a throughput filter time for enhanced flow control is slower than a throughput filter time for distributed network scheduling.

10. An apparatus for communicating in a wireless network, comprising:
    means for periodically adjusting a target queue length based on an estimated throughput of a network link and based on a measured underflow on the network link, the target queue length representing an amount of data being buffered at a network element; and
    means for controlling a link throughput based on the target queue length.

11. An apparatus for communicating in a wireless network, comprising:
    a memory; and
    at least one processor coupled to the memory and configured:
    to periodically adjust a target queue length based on an estimated throughput of a network link and based on a measured underflow on the network link, the target queue length representing an amount of data being buffered at a network element; and
    to control a link throughput based on the target queue length.

12. The apparatus of claim 11, in which the at least one processor is further configured to bound the target queue length with a dynamically updated maximum target queue length and a dynamically updated minimum target queue length.

13. The apparatus of claim 12, in which the minimum target queue length is based on a current maximum target queue length.

14. The apparatus of claim 11, in which the at least one processor is further configured to periodically adjust at every time period the target queue length is above a threshold value.

15. the apparatus of claim 11, in which the target queue length is proportional to the estimated throughput.

16. The apparatus of claim 11, in which the at least one processor is further configured to periodically adjust independently on each of a plurality of network links.

17. The apparatus of claim 11, in which the at least one processor is further configured to temporarily boost a priority of a network link when a current queue length is greater than the target queue length.

18. The apparatus of claim 11, in which the estimated throughput is based on a filtered value when a queue is non-empty.

19. The apparatus of claim 18, in which a throughput filter time for enhanced flow control is slower than a throughput filter time for distributed network scheduling.

20. A computer program product for wireless communications in a wireless network, comprising:
    a non-transitory computer-readable medium having program code recorded thereon, the program code comprising:
    program code to periodically adjust a target queue length based on an estimated throughput of a network link and based on a measured underflow on the network link, the target queue length representing an amount of data being buffered at a network element; and
    program code to control a link throughput based on the target queue length.

* * * * *